(12) United States Patent
Sarkinen et al.

(10) Patent No.: US 7,835,375 B2
(45) Date of Patent: Nov. 16, 2010

(54) METHOD AND APPARATUS FOR PROVIDING MULTI-PROTOCOL, MULTI-STAGE, REAL-TIME FRAME CLASSIFICATION

(75) Inventors: Scott A. Sarkinen, Mounds View, MN (US); Gregg T. Sarkinen, Buffalo, MN (US); Hemant Vrajlal Trivedi, Andover, MA (US)

(73) Assignee: SLT Logic, LLC, Boston, MA (US)

( * ) Notice: Subject to any disclaimer, the term of this patent is extended or adjusted under 35 U.S.C. 154(b) by 186 days.

(21) Appl. No.: 11/950,651

(22) Filed: Dec. 5, 2007

(65) Prior Publication Data

US 2008/0151935 A1 Jun. 26, 2008

Related U.S. Application Data

(60) Division of application No. 11/146,415, filed on Jun. 6, 2005, now abandoned, which is a continuation of application No. 09/849,913, filed on May 4, 2001, now Pat. No. 6,904,057.

(51) Int. Cl.
*H04L 12/28* (2006.01)

(52) U.S. Cl. .................. 370/401; 370/469; 370/392; 370/412; 711/108

(58) Field of Classification Search .................. 711/108
See application file for complete search history.

(56) References Cited

U.S. PATENT DOCUMENTS

| | | | |
|---|---|---|---|
| 5,172,374 A | 12/1992 | De Cristofaris et al. |
| 5,231,633 A | 7/1993 | Hluchyj et al. |
| 5,231,663 A | 7/1993 | Earl et al. |
| 5,260,935 A | 11/1993 | Turner |
| 5,268,900 A | 12/1993 | Hluchyj et al. |
| 5,452,287 A | 9/1995 | DiCecco et al. |
| 5,455,825 A | 10/1995 | Lauer et al. |
| 5,497,371 A | 3/1996 | Ellis et al. |
| 5,541,920 A | 7/1996 | Angle et al. |
| 5,566,170 A | 10/1996 | Bakke et al. |
| 5,570,360 A | 10/1996 | Klausmeier et al. |
| 5,579,312 A | 11/1996 | Regache |

(Continued)

OTHER PUBLICATIONS

"Frame Based ATM Over SONET/SDH Transport (FAST)," The ATM Forum, Technical Committee, fb-fbatm-0151.000, Jul. 2000, 37 pgs.

(Continued)

*Primary Examiner*—Duc C Ho
(74) *Attorney, Agent, or Firm*—Patterson Thuente Christensen Pedersen, P.A.

(57) ABSTRACT

A multi-protocol, multi-stage, real-time frame classifier is disclosed. A preliminary multi-protocol frame composition analyzer is provided for performing preliminary multi-protocol frame classification for incoming frames. A parsing instruction generator is provided for processing at least the incoming frame and the preliminary multi-protocol frame classification to provide parsing instructions. A multi-stage parsing engine provides multi-stage parsing of the incoming frame according to the parsing instructions to generate search results presenting information about the incoming frame. An advanced level of data extraction is provided across various frame protocols without imposing a performance penalty. Longest prefix match searches and/or direct lookup searches are supported. Moreover, conditional extractions, instruction branching, multi-stage processing are all performed in real time.

16 Claims, 9 Drawing Sheets

U.S. PATENT DOCUMENTS

| | | | |
|---|---|---|---|
| 5,598,410 A | 1/1997 | Stone | |
| 5,600,598 A | 2/1997 | Skjaveland et al. | |
| 5,629,936 A | 5/1997 | Lee et al. | |
| 5,666,353 A | 9/1997 | Klausmeier et al. | |
| 5,689,500 A | 11/1997 | Chiussi et al. | |
| 5,748,905 A | 5/1998 | Hauser et al. | |
| 5,764,641 A | 6/1998 | Lin | |
| 5,781,531 A | 7/1998 | Charny | |
| 5,812,476 A | 9/1998 | Seqawa | |
| 5,828,654 A | 10/1998 | Takase et al. | |
| 5,850,399 A | 12/1998 | Ganmukhi et al. | |
| 5,864,540 A | 1/1999 | Bonomi et al. | |
| 5,870,396 A | 2/1999 | Abu-Amara et al. | |
| 5,870,629 A | 2/1999 | Borden et al. | |
| 5,878,229 A | 3/1999 | Bass et al. | |
| 5,896,383 A | 4/1999 | Wakeland | |
| 5,901,095 A | 5/1999 | Crafts | |
| 5,907,511 A | 5/1999 | Crafts | |
| 5,918,002 A | 6/1999 | Klemets et al. | |
| 5,923,596 A | 7/1999 | Wu et al. | |
| 5,923,656 A | 7/1999 | Duan et al. | |
| 5,926,101 A | 7/1999 | Dasgupta | |
| 5,943,481 A | 8/1999 | Wakeland | |
| 5,973,952 A | 10/1999 | Crafts | |
| 5,995,439 A | 11/1999 | Watanabe et al. | |
| 6,018,527 A | 1/2000 | Yin et al. | |
| 6,021,116 A | 2/2000 | Chiussi et al. | |
| 6,021,132 A | 2/2000 | Muller et al. | |
| 6,031,835 A | 2/2000 | Abali et al. | |
| 6,032,190 A | 2/2000 | Bremer et al. | |
| 6,034,956 A | 3/2000 | Olnowich et al. | |
| 6,046,002 A | 4/2000 | Davis et al. | |
| 6,046,979 A | 4/2000 | Bauman | |
| 6,046,980 A | 4/2000 | Packer | |
| 6,047,002 A | 4/2000 | Hartmann et al. | |
| 6,052,375 A | 4/2000 | Bass et al. | |
| 6,067,298 A | 5/2000 | Shinohara | |
| 6,072,800 A | 6/2000 | Lee | |
| 6,072,989 A | 6/2000 | Witters et al. | |
| 6,081,524 A | 6/2000 | Chase et al. | |
| 6,104,700 A | 8/2000 | Haddock et al. | |
| 6,108,305 A | 8/2000 | Charny et al. | |
| 6,118,761 A | 9/2000 | Kalkunte et al. | |
| 6,130,878 A | 10/2000 | Charny | |
| 6,136,638 A | 10/2000 | Lee et al. | |
| 6,141,355 A | 10/2000 | Palmer et al. | |
| 6,141,686 A | 10/2000 | Jackowski et al. | |
| 6,147,970 A | 11/2000 | Troxel | |
| 6,166,403 A | 12/2000 | Castagnetti et al. | |
| 6,167,445 A | 12/2000 | Gai et al. | |
| 6,175,568 B1 | 1/2001 | Awdeh | |
| 6,185,635 B1 | 2/2001 | O'Loughlin et al. | |
| 6,192,406 B1 | 2/2001 | Ma et al. | |
| 6,259,699 B1 | 7/2001 | Opalka et al. | |
| 6,320,864 B1 | 11/2001 | Hebb et al. | |
| 6,333,917 B1 | 12/2001 | Lyon et al. | |
| 6,335,935 B2 | 1/2002 | Kadambi et al. | |
| 6,430,154 B1 | 8/2002 | Hunt et al. | |
| 6,449,656 B1 | 9/2002 | Elzur et al. | |
| 6,453,360 B1 | 9/2002 | Muller et al. | |
| 6,477,670 B1 | 11/2002 | Ahmaduanel | |
| 6,538,989 B1 | 3/2003 | Carter et al. | |
| 6,594,268 B1 | 7/2003 | Aukia et al. | |
| 6,606,317 B1 | 8/2003 | Beadle et al. | |
| 6,608,816 B1 | 8/2003 | Nichols | |
| 6,618,356 B1 | 9/2003 | Bonaventure | |
| 6,651,101 B1 | 11/2003 | Gai et al. | |
| 6,687,247 B1 | 2/2004 | Wilford et al. | |
| 6,721,271 B1 | 4/2004 | Beshai et al. | |
| 6,728,253 B1 | 4/2004 | Jeffries et al. | |
| 6,757,249 B1 | 6/2004 | Kejriwal et al. | |
| 6,760,774 B1 | 7/2004 | Soumiya et al. | |
| 6,768,717 B1 | 7/2004 | Reynolds et al. | |
| 6,772,325 B1 | 8/2004 | Irie et al. | |
| 6,792,470 B2 | 9/2004 | Hakenberg et al. | |
| 6,795,470 B1 | 9/2004 | Spilios | |
| 6,798,746 B1 | 9/2004 | Kloth et al. | |
| 6,826,147 B1 | 11/2004 | Nandy et al. | |
| 6,885,639 B2 | 4/2005 | Kamiya | |
| 6,901,052 B2 | 5/2005 | Buskirk et al. | |
| 6,904,057 B2 | 6/2005 | Sarkinen et al. | |
| 6,934,250 B1 | 8/2005 | Kejriwal et al. | |
| 6,934,294 B2 | 8/2005 | Bertagna | |
| 6,944,168 B2 | 9/2005 | Paatela et al. | |
| 6,947,996 B2 | 9/2005 | Assa et al. | |
| 6,968,554 B1 | 11/2005 | Macdonald et al. | |
| 6,996,062 B1 | 2/2006 | Freed et al. | |
| 7,042,848 B2 | 5/2006 | Santiago et al. | |
| 7,099,275 B2 | 8/2006 | Sarkinen et al. | |
| 7,116,680 B1 | 10/2006 | Kramer et al. | |
| 7,149,187 B1 | 12/2006 | Jacobson et al. | |
| 7,151,744 B2 | 12/2006 | Sarkinen et al. | |
| 7,185,073 B1 | 2/2007 | Gai et al. | |
| 7,215,637 B1 | 5/2007 | Ferguson et al. | |
| 7,272,675 B1 * | 9/2007 | Paul et al. | 710/52 |
| 7,298,738 B1 | 11/2007 | Parruck et al. | |
| 7,539,195 B2 | 5/2009 | Paatela et al. | |
| 7,688,853 B2 | 3/2010 | Santiago et al. | |
| 2001/0007560 A1 | 7/2001 | Masuda et al. | |
| 2001/0033552 A1 | 10/2001 | Barrack et al. | |
| 2001/0048661 A1 | 12/2001 | Clear et al. | |
| 2002/0075803 A1 | 6/2002 | Zaharychuk et al. | |
| 2002/0080780 A1 | 6/2002 | McCormick et al. | |
| 2002/0097677 A1 | 7/2002 | Hoari et al. | |
| 2002/0097726 A1 | 7/2002 | Garcia-Luna-Aceves et al. | |
| 2002/0116527 A1 | 8/2002 | Chen et al. | |
| 2002/0136230 A1 | 9/2002 | Dell et al. | |
| 2002/0141427 A1 | 10/2002 | McAlpine | |
| 2002/0196796 A1 | 12/2002 | Ambe et al. | |
| 2003/0021230 A1 | 1/2003 | Kuo et al. | |
| 2003/0046429 A1 | 3/2003 | Sonksen | |
| 2003/0112756 A1 | 6/2003 | LeGouriellec et al. | |
| 2003/0118029 A1 | 6/2003 | Maher, III et al. | |
| 2004/0125815 A1 | 7/2004 | Shimazu et al. | |
| 2004/0199630 A1 | 10/2004 | Sarkissian et al. | |
| 2004/0202184 A1 | 10/2004 | Yazaki et al. | |
| 2005/0193114 A1 | 9/2005 | Colby et al. | |
| 2006/0159019 A1 | 7/2006 | Buskirk et al. | |
| 2009/0097407 A1 | 4/2009 | Buskirk et al. | |
| 2009/0213856 A1 | 8/2009 | Paatela et al. | |

OTHER PUBLICATIONS

William Wong, "Network Processors Take The High Road . . . And The Low Road," Electronic Design, Jul. 10, 2000, http://www.planetee.com/planetee/servlet/DisplayDocument?ArticleID=6798, Retrieved Jun. 15, 2001, 3 pgs.

"Network Processors Take The High Road . . . And The Low Road," Electronic Design, Jul. 10, 2000, http://www.planetee.com/planetee/servlet/DisplayDocument?ArticleID=6799, Retrieved Jun. 15, 2001.

"Network Processors Take The High Road . . . And The Low Road," Electronic Design—Jul. 10, 2000, http://www.planetee.com/planetee/servlet/DisplayDocument?ArticleID=6800, Retrieved Mar. 7, 2002, 3 pgs.

Network Processors Take The High Road . . . And The Low Road: Electronic Design, Jul. 10, 2000, http://www.planetee.com/planetee/servlet/DisplayDocument?ArticleID=6802, Retrieved Jun. 15, 2001, 1 pg.

"Network Processors Take The High Road . . . And The Low Road," Electronic Design, Jul. 10, 2000, http://www.planetee.com/planetee/servlet/DisplayDocument?Artic 1 eID=6804, Retrieved Jun. 15, 2001, 1 pg.

"Network Processors Take The High Road . . . And The Low Road," Electronic Design, Jul. 10, 2000, http://www.planetee.com/olanetee/servlet/DisplayDocument?Artic 1 eID=6806, Retrieved Jun. 15, 2001, 1 pg.

"Network Processors Take The High Road . . . And The Low Road," Electronic Design, Jul. 10, 2000, http://www.planetee.com/planetee/servlet/DisplayDocument?ArticleID=6808, Retrieved Jun. 15, 2001, 1 pg.

"EZchip Technologies Completes Filing Patent Applications For Its 10/40G Network Processor Core Technology," EZchip—Press Release, Jun. 8, 2000, http://www.ezchio.com/htmlloress000918.html. printed Jan. 22, 2001, 3 pgs.

"7-Layer Packet Processing: A Performance Analysis, White Paper," EZchip, htto://www.ezchio.com/htmlltech7lavers.html. Retrieved Jan. 22, 2001, 8 pgs.

"Network Process Designs for Next-Generation Networking Equipment, White Paper," EZchip, http:/lwww.ezchio.com/html/technspoaper.html, Retrieved Jan. 22, 2001, 8 pgs.

"Gilder Technology Report," EZchip, Sep. 2000, http://www.ezchip.com/htmllgilder.htmI.
Retrieved Jan. 22, 2001, 2 pgs.

"Putting Routing Tables in Silicon," IEEE Network, vol. 6, No. 1, Jan. 1992, 11 pgs.

Bossardt et al., "ABR Architecture and Simulation for an Input-Buffered and Per-VC-Queued ATM Switch," Department of Electrical and Computer Engineering, University of Illinois, 6 pgs.

"C-5™ Digital Communications Processor," Product Brief, C-PORT, A Motorola Company, Date Unknown, 8 pgs.

David Husak, "Network Processors: A Definition and Comparison," C-PORT. A Motorola Company, Date Unknown, 8 pgs.

"Products," Applications, C-PORT, A Motorola Company, http:/lwww.cporICQIJ!.com/oroducts/aoolications.htm. Retrieved Jan. 23, 2001, 3 pgs.

C-PORT™ A Motorola Company, White Paper, by David Husak and Robert Gohn, Entitled: Network Processor Programming Models: The Key to Achieving Faster Time-to-Market and extending Product Life, 8 Pgs, dated May 4, 2000.

U.S. Appl. No. 09/849,810, filed May 4, 2001, Santiago et al.
U.S. Appl. No. 12/252,108, filed May 31, 2005, Glen Buskirk et al.
U.S. Appl. No. 11/146,415, filed Jun. 6, 2005, Scott A. Sarkinen.
U.S. Appl. No. 11/231,297, filed Sep. 20, 2005, Glenn Buskirk et al.
U.S. Appl. No. 11/257,386, filed Apr. 27, 2006, Rodolfo A. Santiago et al.
U.S. Appl. No. 12/437,573, filed May 8, 2009, Jeremy B. Paatela et al.

Heinanen et al., "A Single Rate Three Color Marker", University of Pennsylvania, Sep. 1999, pp. 1-6.

Heinanen eta 1., "A Two Rate Three Color Marker", University of Pennsylvania, Sep. 1999, pp. 1-5.

"Asynchronous Transfer Mode (ATM)", http://iwander.vlsi.uiuc.edu/abr/atmintro.html; printed Apr. 26, 2001; pp. 1-5.

U.S. Pair File Wrapper History for Application No. 11/146,415, Filed Jun. 6, 2005.

U.S. Pair File Wrapper History for Application No. 09/849,913, filed May 4, 2001.

U.S. Pair File Wrapper History for Application No. 09/849,810, filed May 4, 2001.

U.S. Pair File Wrapper History for Application No. 11/058,904, filed Feb. 15, 2005.

Application and File History of U.S. Appl. No. 11/257,386, Inventors Santiago et al., filed Oct. 24, 2005, as available on Pair at www.uspto.gov.

Application and File History of U.S. Appl. No. 09/849,804, Inventors Paatela et al., filed May 4, 2001, as available on Pair at www.uspto.gov.

Application and File History of U.S. Appl. No. 11/224,692, Inventors Paatela et al., filed Sep. 12, 2005, as available on Pair at www.uspto.gov.

Application and File History of U.S. Appl. No. 12/437,573, Inventors Paatela et al., filed May 8, 2009, as available on Pair at www.uspto.gov.

Application and File History of U.S. Appl. No. 09/849,914, Inventors Buskirk et al., filed May 4, 2001, as available on Pair at www.uspto.gov.

Application and File History of U.S. Appl. No. 12/252,108, Inventors Buskirk et al., filed Oct. 15, 2008, as available on Pair at www.uspto.gov.

Application and File History of U.S. Appl. No. 09/957,750, Inventors Sarkinen et al., filed Sep. 21, 2001, as available on Pair at www.uspto.gov.

Application and File History of U.S. Appl. No. 09/957,751, Inventors Sarkinen et al., filed Sep. 21, 2001, as available on Pair at www.uspto.gov.

"Introduction to ABR," http://iwander.vlsi.uiuc.edu/abr/abrintro.html, printed Apr. 26, 2001, pp. 1-4.

"The Virtual Output Queue," http://iwander.vlsi.uiuc.edu/abr/virtqueue.html, printed Apr. 26, 2001, pp. 1-7.

"Simulation Results," http://iwander/vIsi.uiuc.edu/abr/simulation_results.html, printed Apr. 26, 2001, pp. 1-4.

"Reinventing the Switch Fabric Architecture," Communication System Design, http://www.csdmag.com/story/OEG20010521S0113, Jun. 1, 2001.

David Husak et al., "Network Processor Programming Models: The Key to Achieving Faster Time-To-Market and Extending Product Life", C-Port, A Motorola Company, May 4, 2000; 8 pages.

Application and File History of U.S. Appl. No. 11/231,297, filed Sep. 20, 2005, Inventors Buskirk et al., as available on Pair at www.uspto.gov.

* cited by examiner

METHOD AND APPARATUS FOR PROVIDING MULTI-PROTOCOL, MULTI-STAGE, REAL-TIME FRAME CLASSIFICATION

CROSS-REFERENCE TO OTHER PATENT APPLICATIONS

Prior Application

This application is a divisional application of U.S. application Ser. No. 11/146,415 filed Jun. 6, 2006, entitled "Method and Apparatus for Providing Multi-Protocol, Multi-Protocol, Multi-Stage, Real-Time Frame Construction", which in turn is a continuation of U.S. application Ser. No. 09/849,913 filed May 4, 2001, now U.S. Pat. No. 6,904,057 issued Jun. 7, 2005, both of which are herein incorporated by reference.

BACKGROUND OF THE INVENTION

1. Field of the Invention

This invention relates in general to a method and apparatus for handling packets, and more particularly to a method and apparatus for providing multi-protocol, multi-stage, real-time frame classification.

2. Description of Related Art

Standards-based LAN systems work reasonably well at transfer rates up to about 100 Mbps. At transfer rates above 100 Mbps, providing the processing power required by a packet switch interconnecting a group of networks becomes economically challenging for the performance levels desired. This difficulty in economically "scaling up" performance is beginning to cause restrictions in some user's planned network expansions. Also, today's data networks do not provide network managers with enough control over bandwidth allocation and user access.

Next generation networks are expected to support "multimedia" applications with their much greater bandwidth and real-time delivery requirements. The next generation networks should also have the ability to dynamically adjust the network so that it can guarantee a predetermined amount of bandwidth for the requested service level agreement. Additionally, it is desirable to provide access, performance, fault tolerance and security between any specified set of end systems as directed by the network's manager.

One of the biggest opportunities for service providers today is to provide IP-based internetworking services to meet the exponential growth in demand from both business and residential customers. For example, voice and video based multimedia applications are expected to become a significant portion of the Internet. However, support for multimedia applications in the current Internet is at its initial stages. To fulfill the promise of remote work styles and B2C (Business-to-Consumer) e-commerce, broadband access for small offices, home offices and residences is critical. In today's information-based society, many individuals desire remote data connectivity to an office or remote data site. Remote individuals desire remote and transparent connectivity to the corporate office or a remote data site, including connectivity to the corporate office local area network (LAN).

Broadband systems are being developed and implemented to provide higher capacities, more efficient use of bandwidth, and the ability to integrate voice, data, and video communications. The number and type of communication services has also been rapidly expanding, including the above-mentioned "multimedia" services such as video teleconferencing, video/movies on demand and the like.

While broadband access is becoming more common, there are many competing technologies for delivering broadband access. For example, there are a number of standards used in digital telecommunications, including TCP/IP, Ethernet, HDLC, ISDN, ATM, X.25, Frame Relay, Digital Data Service, FDDI (Fiber Distributed Data Interface), T1, xDSL, Wireless, Cable Modems, and Satellite among others. Many of these standards employ different packet and/or frame formats. The term "frame" generally refers to encapsulated data at OSI layer 2, including a destination address, control bits for flow control, the data or payload, and CRC (cyclic redundancy check) data for error checking. The term "packet" generally refers to encapsulated data at OSI layer 3. However, in the present application, the term packet and frame and cell will be used interchangeably.

In general, a packet format or frame format refers to how data is encapsulated with various fields and headers for transmission across a network. For example, a data packet typically includes an address destination field, a length field, an error correcting code (ECC) field or cyclic redundancy check (CRC) field, as well as headers and trailers to identify the beginning and end of the packet. The terms "packet format" and "frame format", also referred to as "cell format", are generally synonymous.

In order for a router or gateway to be able to interface between communication systems employing different packet or frame formats, the node element, such as the router or gateway, is required to perform a packet conversion to convert the data from a first packet format used by the first communication system to a second packet format used by the second communication system. As the number of possible packet formats or types increases, the amount of logic required to convert between these different packet formats also increases.

Furthermore, the emergence of high speed networking technologies, e.g., ATM cell-based technology, xDSL, cable modem technology and Gigabit Ethernet, makes possible the integration of multiple types of traffic like speech, video and data over the same communication network. The communication circuits which may be shared in such network include transmission lines, program controlled processors, nodes or links, and data or packet buffers. An access node in such network should thus be designed for supporting the access of the user existing communication equipment with their corresponding protocols as well as for accommodating new equipment. Accordingly, it is essential to know the different requirements of each traffic in order to optimize the different processes.

Real-time traffic has more constraining requirements than non-real-time ones, i.e., end-to-end delay and jitter. It is necessary to be able to give priority to the real-time packets in order to minimize these delays. Meanwhile, the packet loss must be guaranteed both for real-time and non-real-time applications that have reserved bandwidth in the network while it is not mandatory for non-reserved type of traffic.

Therefore, it is important to provide the network components (i.e. nodes or links) with mechanisms that control the priority of the packets and process them so that the desired quality of service (QOS) to their corresponding connections is guaranteed. It is also important to offer the same service to connections having the same QOS requirements by providing them with a fair share of the network transmission capacities.

As can be seen, the technological convergence of computer and communication networks has led to more complex transmission of data, voice, images etc. Depending on the network, various protocols are hierarchically ordered, resulting in a vertical stack of protocols. Each of these protocols interact with the adjacent ones to organize the information exchange and transmission between remote systems, such as host computers. If an application program, for example, which runs on a first system requires the use of data of a second system, an exchange of information takes place. When the second system receives a request to send specific information, this information has to be transmitted from the highest protocol level, e.g., the application layer, down through all lower protocol levels prior to being sent along the physical link. Each protocol layer adds its own layer-specific connection information to data packets containing the request information that are received from the higher layer.

Thus, a communication connection between two systems is defined in a packet header, hereinafter referred to as protocol header, by the aggregate of fields carrying connection information of the vertical protocol stack. Nevertheless, when receiving a data stream made up of data packets at a receiver site, prior to forwarding, routing, multiplexing or compressing the data packets, the protocol header has to be scanned to extract information to at least identify the connection information.

A fundamental function in processing packets in networking communications is filtering. Filtering is the process of applying a set of rules to an incoming packet in order to determine its forwarding characteristics. Advanced frame identification and/or marking may be used to identify the entire frame composition layer by layer. The rules that are applied to perform the filtering can vary. For example, plural criteria may be used in a given table lookup. Another example uses the results of a one table lookup with certain packet protocol criteria to generate subsequent table lookups. Current methods used to obtain this type of filtering are implemented in software and thereby do not scale with the bandwidth in today's networks. Furthermore, these operations consume a considerable amount of time in the protocol processing, in particular when dealing with many connections, e.g., in a server, or when processing multimedia data streams. The result of this is cumbersome and conventional filtering applied to the high-speed networks leads to network degradation.

Hardware implementation of a routing table for the translation of packet identifiers into an appropriate physical output link has been described in "Putting Routing Tables in Silicon", T.-B. Pei and C. Zukowski, IEEE Network Magazine, January 1992, pp. 42-50. This approach is mainly characterized in that a Content Addressable Memory (CAM) is employed to match connection information in the header of a single protocol. In addition, the advantages and disadvantages of CAMs versus conventional Random Access Memories (RAM), used to store routing information, have been evaluated by Pei and Zukowski.

In addition to the above-mentioned problems, another problem associated with using a CAM to match connection information in the header. To make filtering decisions, a CAM table is built. The CAM table contains search words. The table may contain fields for the IP source, the type of service, the TCP source port, etc. However, as search words are built, the amount of memory required explodes exponentially.

Neither of the two systems above, both of them relating to the solution of sub-problems, nor the known software approaches allow fast processing of multiple protocols. A wide variety of communication protocols exist, but all tend to fall into one of the following groups: LAN protocols, WAN protocols, network protocols, and routing protocols. LAN protocols operate at the network and data link layers of the OSI model and define communication over the various LAN media. WAN protocols operate at the lowest three layers of the OSI model and define communication over the various wide-area media. Routing protocols are network-layer protocols that are responsible for path determination and traffic switching. Finally, network protocols are the various upper-layer protocols that exist in a given protocol suite. The processing of protocol headers and the recognition of different protocol types in real time is a very complicated and difficult undertaking. In almost all network systems, header processing is still a major CPU-cycle (Central Processor Unit) consuming activity. It can be seen that there is a need for a method and apparatus for providing multi-protocol, multi-stage, real-time frame classification.

SUMMARY OF THE INVENTION

To overcome the limitations in the prior art described above, and to overcome other limitations that will become apparent upon reading and understanding the present specification, the present invention discloses a method and apparatus for providing multi-protocol, multi-stage, real-time frame classification.

The present invention solves the above-described problems by providing an advanced level of data extraction across various frame protocols. Longest prefix match searches and/or direct lookup searches are supported. Moreover, conditional extractions, instruction branching, and multi-stage processing are all performed in real time.

A method in accordance with the principles of the present invention includes performing preliminary multi-protocol frame classification for incoming frames, processing at least the incoming frame and the preliminary multi-protocol frame classification to provide parsing instructions, and providing multi-stage parsing of the incoming frame according to the parsing instructions to generate search results presenting information about the incoming frame.

Other embodiments of a method in accordance with the principles of the invention may include alternative or optional additional aspects. One such aspect of the present invention is that the performing preliminary multi-protocol frame classification further includes resolving a composition for the incoming frame.

Another aspect of the present invention is that the processing further includes storing an incoming frame in a frame buffer, generating the parsing instructions for the incoming frame based upon the multi-protocol frame classification and aligning the generated parsing instructions with a frame selected from the incoming frames stored in the frame buffer.

Another aspect of the present invention is that the providing multi-stage parsing of the incoming frame further includes reading at least a portion of the incoming frame from a frame buffer, interpreting the parsing instructions and executing macros for performing parsing functions on at least the portion of the incoming frame using the interpreted parsing instructions.

Another aspect of the present invention is that the providing multi-stage parsing of the incoming frame further includes generating extraction instructions in response to the at least incoming frame and the preliminary multi-protocol frame classification, using the extraction instructions to produce search queries, and applying the search queries against a memory to produce the search results.

Another aspect of the present invention is that the using the extraction instructions further comprises conditional extraction.

Another aspect of the present invention is that conditional extraction comprises determining whether extracted bits of data from the packet meet a predetermined criteria.

Another aspect of the present invention is that the providing multi-stage parsing of the incoming frame further includes reprocessing the search results to generate refined parsing instructions and parsing of the incoming frame according to the refined parsing instructions to generate refined search results, the refined search results providing greater information about the incoming frame.

Another aspect of the present invention is that the processing at least the incoming frame and the preliminary multi-protocol frame classification further includes processing the search results, the incoming frame and the preliminary multi-protocol frame classification to provide refined parsing instructions.

Another aspect of the present invention is that the parsing instructions includes a location identifier and an associated instruction to be applied to the frame at the position identified by the location identifier.

Another aspect of the present invention is that the frame includes one of a plurality of frame protocols, the performing preliminary multi-protocol frame classification further including classifying a protocol identity.

Another aspect of the present invention is that the performing preliminary multi-protocol frame classification further includes identifying each layer protocol and writing the frame into memory along with a protocol layer code.

Another aspect of the present invention is that providing multi-stage parsing of the incoming frame further includes using the protocol layer code as a start vector into an instruction memory, the instruction memory containing instructions for parsing the frame and pointers to access selected words of the frame in a frame buffer.

Another aspect of the present invention is that the performing preliminary multi-protocol frame classification further includes identifying each layer protocol and writing the frame into memory along with a protocol layer code, the method further including processing the instructions from the instruction memory, resolving the pointers according to the protocol layer table and aligning the frame data with the instruction words.

Another aspect of the present invention is that the search results are fed back to an instruction controller to be used as data that a parsing engine can parse through a data pipe.

Another aspect of the present invention is that the memory includes a content addressable memory and the search queries are used to search the content addressable memory.

Another aspect of the present invention is that the memory includes a static random access memory and the search queries are indexed directly to a static random access memory.

Another aspect of the present invention is that the method further includes providing a parser instruction set in the instruction memory to define microcode used for generating the parser instructions.

Another aspect of the present invention is that the method further includes forwarding the frame and the search results.

Another aspect of the present invention is that the search results include the frame classification.

Another aspect of the present invention is that the search results are fed back to an instruction controller to be used as a start vector for subsequent processing stages.

Another aspect of the present invention is that providing multi-stage parsing of the incoming frame further comprises performing conditional branching, the conditional branching allowing specific instructions to be performed based upon satisfaction of a predetermined criteria.

In another embodiment of the present invention, a multi-protocol, multi-stage, real-time frame classifier is provided. The multi-protocol, multi-stage, real-time frame classifier includes a preliminary multi-protocol frame composition analyzer for performing preliminary multi-protocol frame classification for incoming frames, a parsing instruction generator for processing at least the incoming frame and the preliminary multi-protocol frame classification to provide parsing instructions and a multi-stage parsing engine for providing multi-stage parsing of the incoming frame according to the parsing instructions to generate search results presenting information about the incoming frame.

Another aspect of the present invention is that the preliminary multi-protocol frame classifier resolves a composition for the incoming frame.

Another aspect of the present invention is that the parsing instructions generator processing further includes a frame buffer for storing an incoming frame, an instruction generator for creating the parsing instructions for the incoming frame based upon the multi-protocol frame classification and a data pipe for aligning the generated parsing instructions with a frame selected from the incoming frames stored in the frame buffer.

Another aspect of the present invention is that the multi-stage parsing engine reads at least a portion of the incoming frame from a frame buffer, interprets the parsing instructions and executes macros for performing parsing functions on at least the portion of the incoming frame using the interpreted parsing instructions.

Another aspect of the present invention is that the multi-stage parsing engine generating extractions instructions in response to the at least incoming frame and the preliminary multi-protocol frame classification.

Another aspect of the present invention is that the multi-stage parsing engine performs conditional extractions using the extraction instructions.

Another aspect of the present invention is that conditional extraction comprises determining whether extracted bits of data from the packet meet a predetermined criteria.

Another aspect of the present invention is that the multi-stage parsing engine further includes an extractor for using the extraction instructions to produce search queries and a memory for applying the search queries against to produce the search results.

Another aspect of the present invention is that the multi-protocol, multi-stage, real-time frame classifier further includes a feedback path for allowing the search results to be reprocessed to generate refined parsing instructions that are used by the parsing engine to generate refined search results, the refined search results providing greater information about the incoming frame.

Another aspect of the present invention is that the parsing instructions generator processes the search results, the incoming frame and the preliminary multi-protocol frame classification to provide refined parsing instructions.

Another aspect of the present invention is that the parsing instructions include a location identifier and an associated instruction to be applied to the frame at the position identified by the location identifier.

Another aspect of the present invention is that the frame includes one of a plurality of frame protocols, the preliminary multi-protocol frame classifier classifying the incoming frame to identify a protocol identity.

Another aspect of the present invention is that the preliminary multi-protocol frame classifier identifies each layer protocol and writes the frame into memory along with a protocol layer code.

Another aspect of the present invention is that the multi-stage parsing engine uses the protocol layer code as a start vector for an instruction memory, the instruction memory containing instructions for parsing the frame and pointers to access selected words of the frame in a frame buffer.

Another aspect of the present invention is that the parsing instructions generator identifies each layer protocol and writes the frame into memory along with a protocol layer code and wherein the multi-stage parsing engine processes the instructions from the instruction memory, resolves the pointers according to the protocol layer table and aligns the frame data with the instruction words.

Another aspect of the present invention is that the search results are fed back to the parsing instructions generator to be used as data that a parsing engine can parse through a data pipe.

Another aspect of the present invention is that the memory includes a content addressable memory and the search queries are used to search the content addressable memory.

Another aspect of the present invention is that the memory includes a static random access memory and the search queries are indexed directly to a static random access memory.

Another aspect of the present invention is that the parsing instructions generator provides a parser instruction set in an instruction memory to define microcode used for generating the parser instructions.

Another aspect of the present invention is that the multi-stage parsing engine forwards the frame and the search results.

Another aspect of the present invention is that the search results include the frame classification.

Another aspect of the present invention is that the parsing instructions generator further includes an instruction controller and wherein the search results are fed back to the instruction controller to be used as a start vector for subsequent processing stages.

Another aspect of the present invention is that the multi-stage parsing engine performs conditional branching, the conditional branching allowing specific instructions to be performed based upon satisfaction of a predetermined criteria.

In another embodiment of the present invention, an article of manufacture comprising a program storage medium readable by a computer is provided. The medium tangibly embodies one or more programs of instructions executable by the computer to perform a method for parsing frames in a network flow, wherein the method includes performing preliminary multi-protocol frame classification for incoming frames, processing at least the incoming frame and the preliminary multi-protocol frame classification to provide parsing instructions and providing multi-stage parsing of the incoming frame according to the parsing instructions to generate search results presenting information about the incoming frame.

In another embodiment of the present invention, another method for handling packets is provided. The method including performing preliminary multi-protocol frame classification for incoming frames, processing at least the incoming frame and the preliminary multi-protocol frame classification to provide parsing instructions and providing parsing of the incoming frame according to the parsing instructions to generate search results presenting information about the incoming frame.

In another embodiment of the present invention, another method for handling packets is provided. The method includes processing at least the incoming frame to provide parsing instructions and providing multi-stage parsing of the incoming frame according to the parsing instructions to generate search results presenting information about the incoming frame.

In another embodiment of the present invention, another article of manufacture comprising a program storage medium readable by a computer is provided. The medium tangibly embodies one or more programs of instructions executable by the computer to perform a method for parsing frames in a network flow, wherein the method includes performing preliminary multi-protocol frame classification for incoming frames, processing at least the incoming frame and the preliminary multi-protocol frame classification to provide parsing instructions and providing parsing of the incoming frame according to the parsing instructions to generate search results presenting information about the incoming frame.

In another embodiment of the present invention, another article of manufacture comprising a program storage medium readable by a computer is provided. The medium tangibly embodies one or more programs of instructions executable by the computer to perform a method for parsing frames in a network flow, wherein the method includes processing at least the incoming frame to provide parsing instructions and providing multi-stage parsing of the incoming frame according to the parsing instructions to generate search results presenting information about the incoming frame.

In another embodiment of the present invention, another multi-protocol, multi-stage, real-time frame classifier is provided. The multi-protocol, multi-stage, real-time frame classifier including a preliminary multi-protocol frame composition analyzer for performing preliminary multi-protocol frame classification for incoming frames, a parsing instruction generator for processing at least the incoming frame and the preliminary multi-protocol frame classification to provide parsing instructions and a parsing engine for providing multi-stage parsing of the incoming frame according to the parsing instructions to generate search results presenting information about the incoming frame.

In another embodiment of the present invention, another multi-protocol, multi-stage, real-time frame classifier is provided. The multi-protocol, multi-stage, real-time frame classifier includes a parsing instruction generator for processing an incoming frame to provide parsing instructions and a multi-stage parsing engine for providing multi-stage parsing of the incoming frame according to the parsing instructions to generate search results presenting information about the incoming frame.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as changes may be made without departing from the scope of the present invention.

The present invention provides a method and apparatus for providing multi-protocol, multi-stage, real-time frame classification. Advanced level of data extraction is provided across various frame protocols without imposing a performance penalty. Longest prefix match searches and/or direct lookup searches are supported. Moreover, conditional extractions, instruction branching, and multi-stage processing are all performed in real time.

Figure 1:
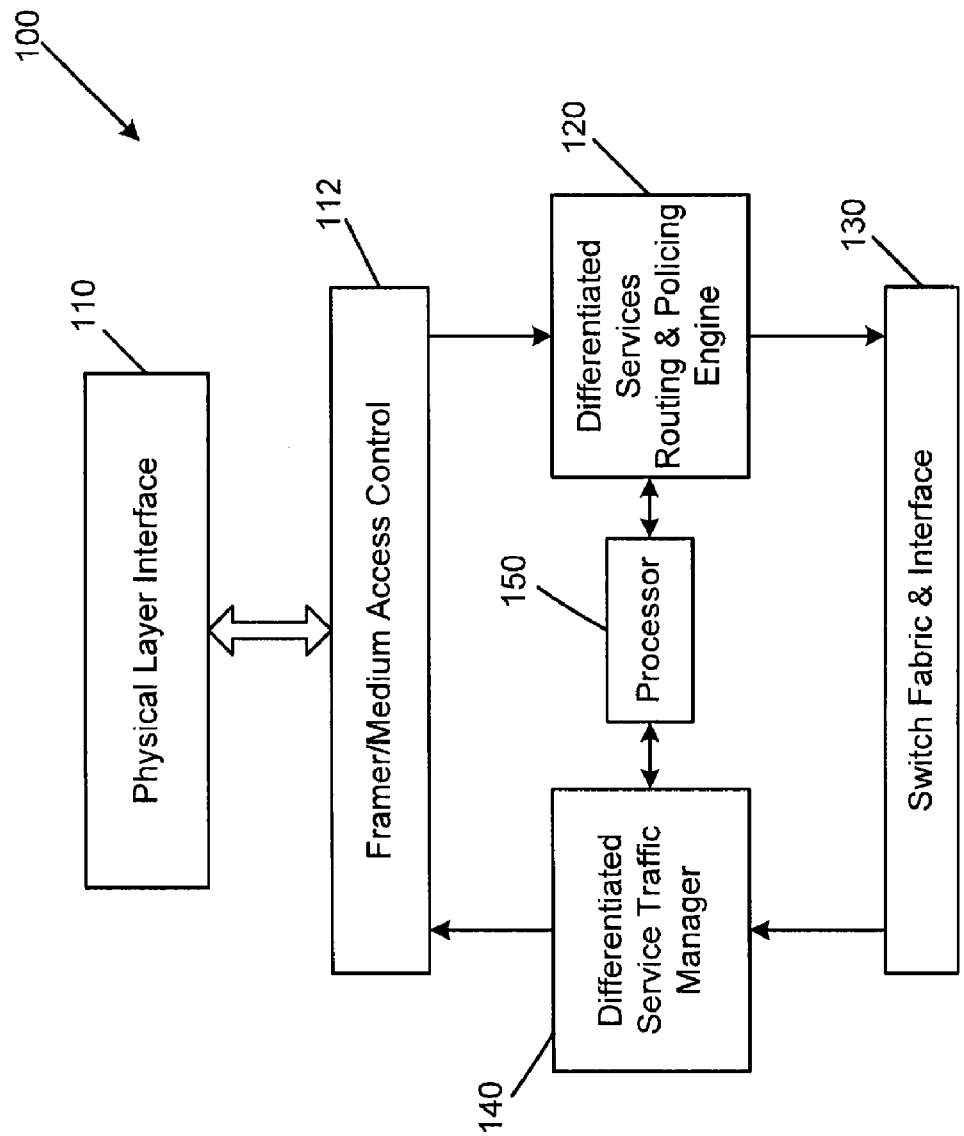
FIG. 1 illustrates a block diagram for a network device that includes a multi-protocol route/flow classifier with sophisticated policing engines and packet transformation capability.

FIG. 1 illustrates a block diagram for a network device 100 that includes a multi-protocol route/flow classifier with sophisticated policing engines and packet editing capability. The network device 100 provides advanced services at 10 Gbps, at least, by tightly coupling parsing, policing, and packet editing. This coupling allows the device to perform dynamic packet editing for QoS based on the current flow state and also effectively handles dynamic header processing such as required by MPLS routers. A physical layer interface 110 provides access to a framer 112 on the ingress. A input frame device 120 includes a parsing engine for handling differentiated services and providing packet analysis, a rate policing engine, and editor functionality. Tightly coupled parsing, policing, and packet editing allows the collective device to perform dynamic packet editing for quality of service based on the current flow state and also effectively handles dynamic header processing such as required by MPLS routers. A session or flow is defined as a series of IP datagrams that share a common destination IP address and traffic-engineering characteristics.

The input frame device 120 provides differentiated services, routing, and policing and provides them to a switch fabric and interface 130. On the egress side, the egress frame device 140 provides differentiated services traffic management. The egress frames are then provided to the framer 112 and then onto the physical layer interface 110. A processor 150 controls at least the input 120 and egress 140 frame devices.

Figure 2:
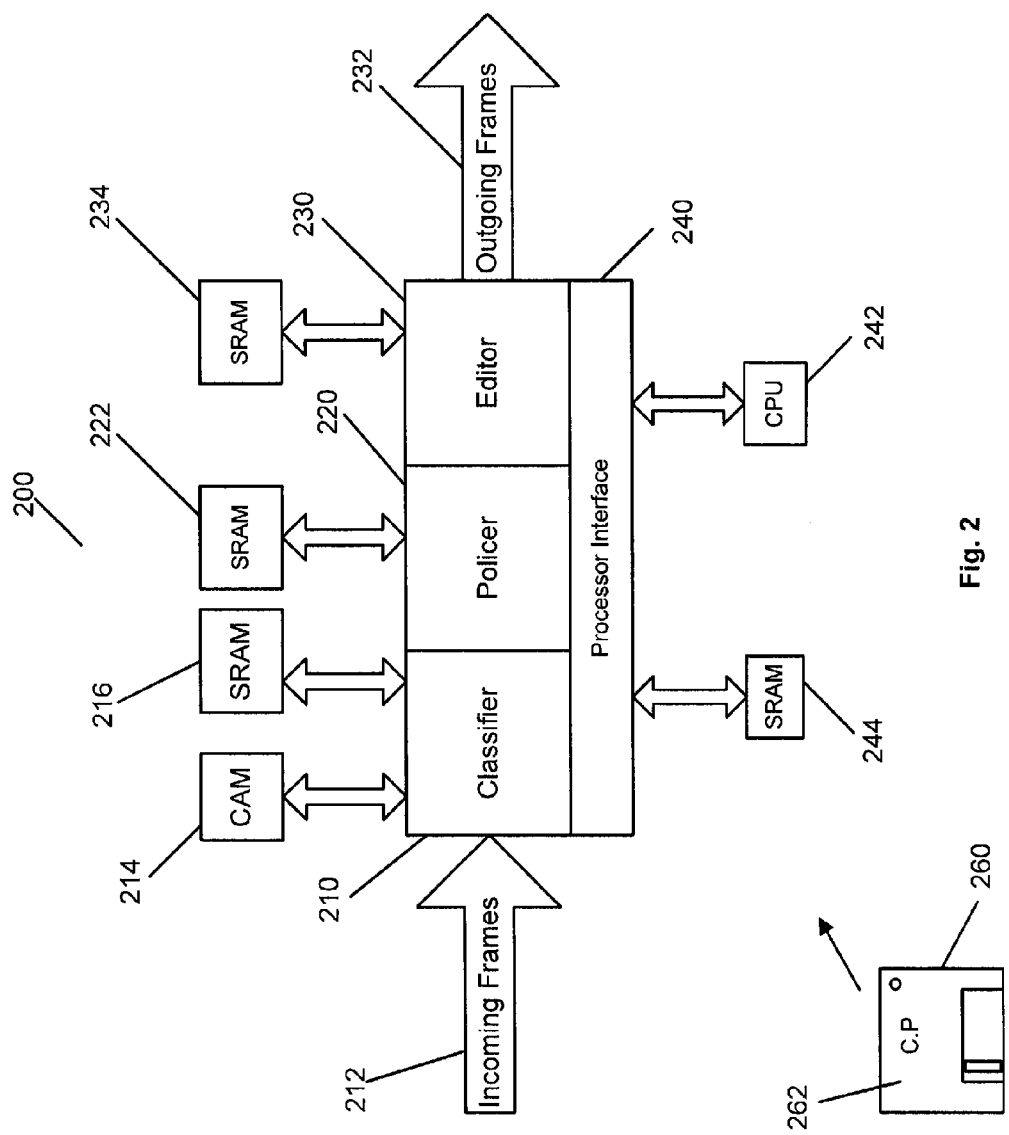
FIG. 2 is a block diagram of an input frame device according to the present invention.

FIG. 2 is a block diagram of an input frame device 200 according to the present invention. In FIG. 2, the input frame device includes a classifier 210 that receives incoming frames 212. The classifier builds queries (search words) to be search against either a CAM 214 or indexed directly to a SRAM 216. A policer 220 is provided to ensure flow conformance to a maximum allowed peak rate and a contractually obliged committed rate for flows, e.g., DiffServ IP and MPLS. The policer 220 includes an SRAM 222 for storing a drop policy for each connection. An editor 230 performs the last operations to the packet before being forwarded as outgoing frames 232. The editor 230 may fetch editor instructions and support policing results. An external SRAM 234 is provided for storing editor instructions. A processor interface allows for control of the classifier 210, policer 220 and editor 230 via the processor 242. In addition, a memory 244 may be provided to the processor interface 240 also.

Figure 3:
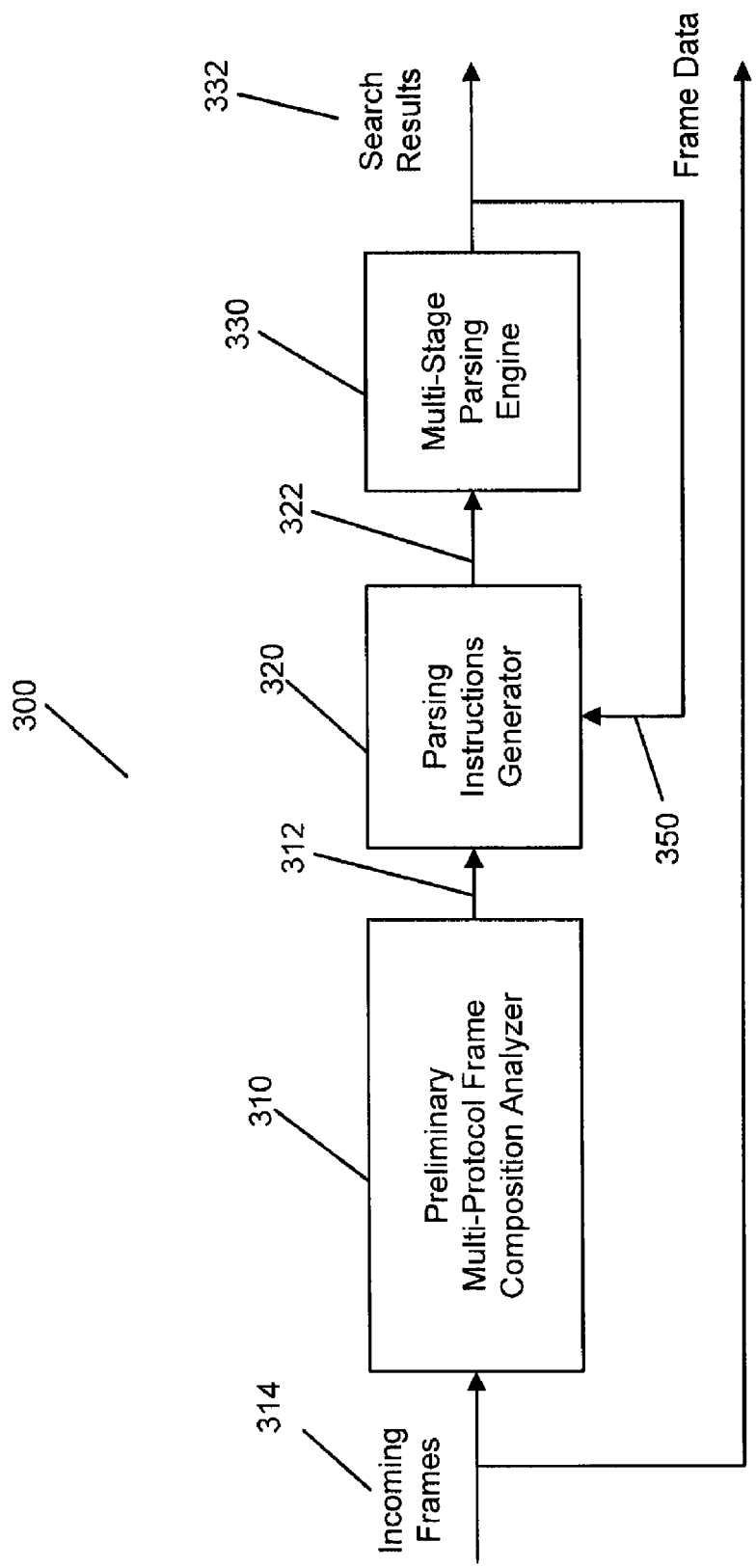
FIG. 3 illustrates a block diagram of an apparatus for providing multi-protocol, multi-stage, real-time frame classification according to the present invention.

FIG. 3 illustrates a block diagram 300 of an apparatus for providing multi-protocol, multi-stage, real-time frame classification according to the present invention. In FIG. 3, a preliminary frame composition analyzer 310 is provided to produce the preliminary multi-protocol frame classification 312 for incoming frames 314. A parsing instructions generator 320 is provided for processing at least the incoming frame 314 and the preliminary multi-protocol frame classification 312 to provide parsing instructions 322. A multistage parsing engine 330 receives at least a portion of the incoming frame 314 and the parsing instructions 322 to produce the search results 332.

The task of packet parsing involves identification of the fields in the packet. Field identification does not present a problem in the case of Layer 2/Layer 3/Layer 4 applications where the field offsets are known either with respect to the start of the packet or are dependent on the contents of another field. However, content-aware classification rules often require fields located within the data packet payload. In this case, the off-sets of fields may not be known apriori and the rule must encode the parsing and classification information.

The multistage parsing engine 330 provides multi-stage parsing of the incoming frame 314 according to the parsing instructions 322 to generate search results that presents information about the incoming frame 314. The search results 332 may be feedback 350 to the parsing instructions generator 320 for reprocessing of the search results 332 to generate parsing instructions 322 that are refined. Then, the multistage parsing engine 330 parses at least a portion of the incoming frame according to the refined parsing instructions 322 to generate search results 330 that are refined. The refined search results 330 provided greater information about the incoming frame 314.

Accordingly, the parsing engine 330 performs layer classification and tagging via a search/lookup engine. The parser 330 includes bitwise extraction from layer and offset and limited operators and masks. The entire frame is available for parsing and extraction. The parser generates, for example, up to four 72-bit search keys that can be concatenated for up to 288 bit searches and is capable, for example, of 2 stage lookup. For example, the parsing engine 330 may perform 512 programmed extractions on the first search and 512 for second stage extractions.

A microcode controlled programmable sequencer implementation drives the parsing engine. The parsing engine 330 is programmable to build search words. The incoming frame 314 is parsed to flexibly generate the search words from data anywhere within the frame or cell. The microcode instruction set contains specialized instructions defined to perform powerful and flexible operations such as EXTRACT, MASK, NOT, AND, OR, XOR, and Range. The instructions and associated data are executed from a dynamically loadable code space.

To prevent table explosion, a bit may be set as a key to indicate whether a field in a packet is within a predetermined range. For example, when a packet is analyzed, if the TCP source port is within a predetermined range, a bit is set to represent the TCP source port rather than building a search word having the typical 16 bits for the TCP source port. Accordingly, the CAM is used more effectively because less memory is needed to build the search words. The results of the CAM search are applied to the SRAM and returned to the result buffer. The parser 330 builds a search word by extracting bits of data from the packet and prepending bits representing the search type.

The parsing engine 330 parses the incoming frame 314 by extracting data into search words having various combinations of bits, e.g., 32, 64, 128, or 256 bits. Multiple searches may be performed, e.g., up to four searches may be issued to the CAM for Longest Prefix Matching or Direct SRAM Lookup (SRAM). For the Direct SRAM Lookup searches, the upper bits are truncated to match the width of the SRAM address space. The two words within the search word also have a corresponding eight bit search type. Given a specified extraction criteria, the appropriate microcode for the parser is provided. The protocol layer, extract data start offset, bits to be extracted, search word and location for extracted bits, N Bits of search type and SRAM or CAM Lookup parameters must be specified before the appropriate microcode can be generated. Optional parameters include data operations, e.g., greater than, less than, equal, NOT, AND, OR, XOR, and Range, that returns a single true/false bit that can be inserted into the search word. The true/false bit can also be used as a conditional branch, as will be explained with reference to FIG. 4. Optional parameters also includes a bit mask and operand(s) and branch instructions. Multiple microcode instructions can be concatenated into the same search words. The last instruction of a multiple instruction operation must indicate the extraction is complete.

The parsing engine 330 supports at least Longest Prefix Matching (LPM) lookups for forwarding table entries, MPLS label-based routing using direct lookup SRAM tables, ATM cell Virtual Path Identifier (VPI) Vertical Connector Identifier (VCI) mapping using direct lookup SRAM tables and Layer 3 lookups of source address (SA), destination address (DA), and type-of-service (TOS) fields. The parsing engine 330 may perform accesses to CAM or direct lookup SWAM. The parsing engine 330 supports a multi-stage memory lookup where the Connection ID resulting from one lookup is utilized to create the query word for a subsequent lookup.

Figure 4:
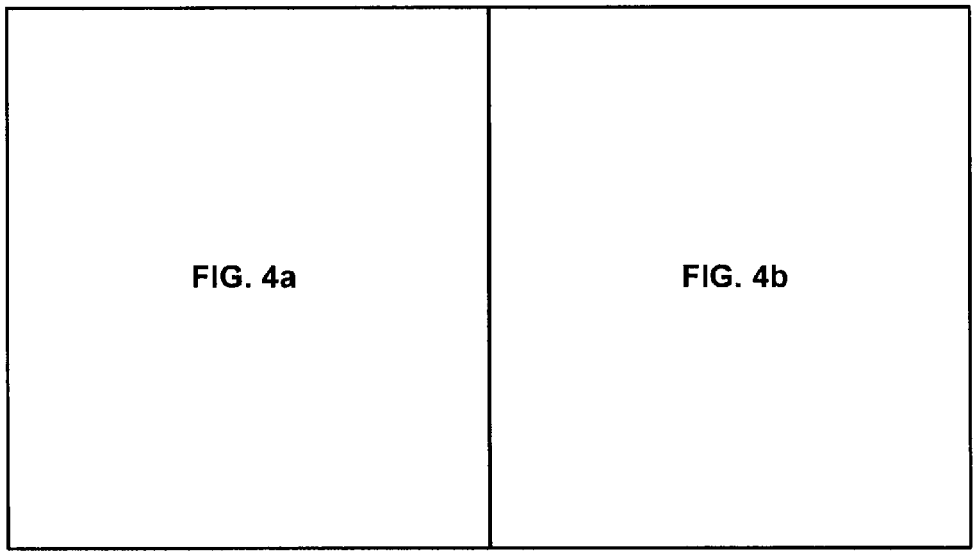
FIG. 4 illustrates a detailed block diagram of an apparatus for providing multi-protocol, multi-stage, real-time frame classification according to the present invention.
Figure 4A:
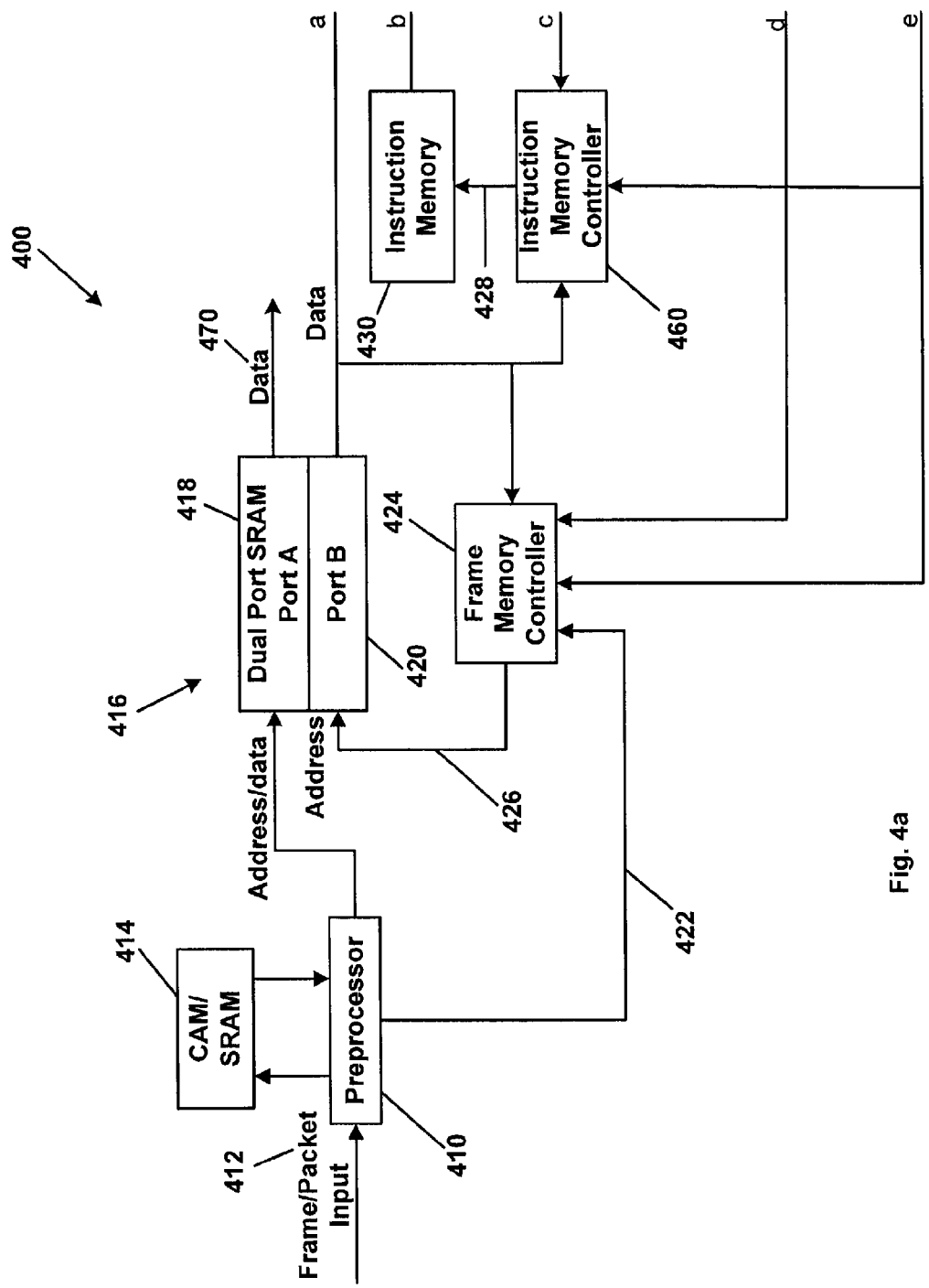
Figure 4B:
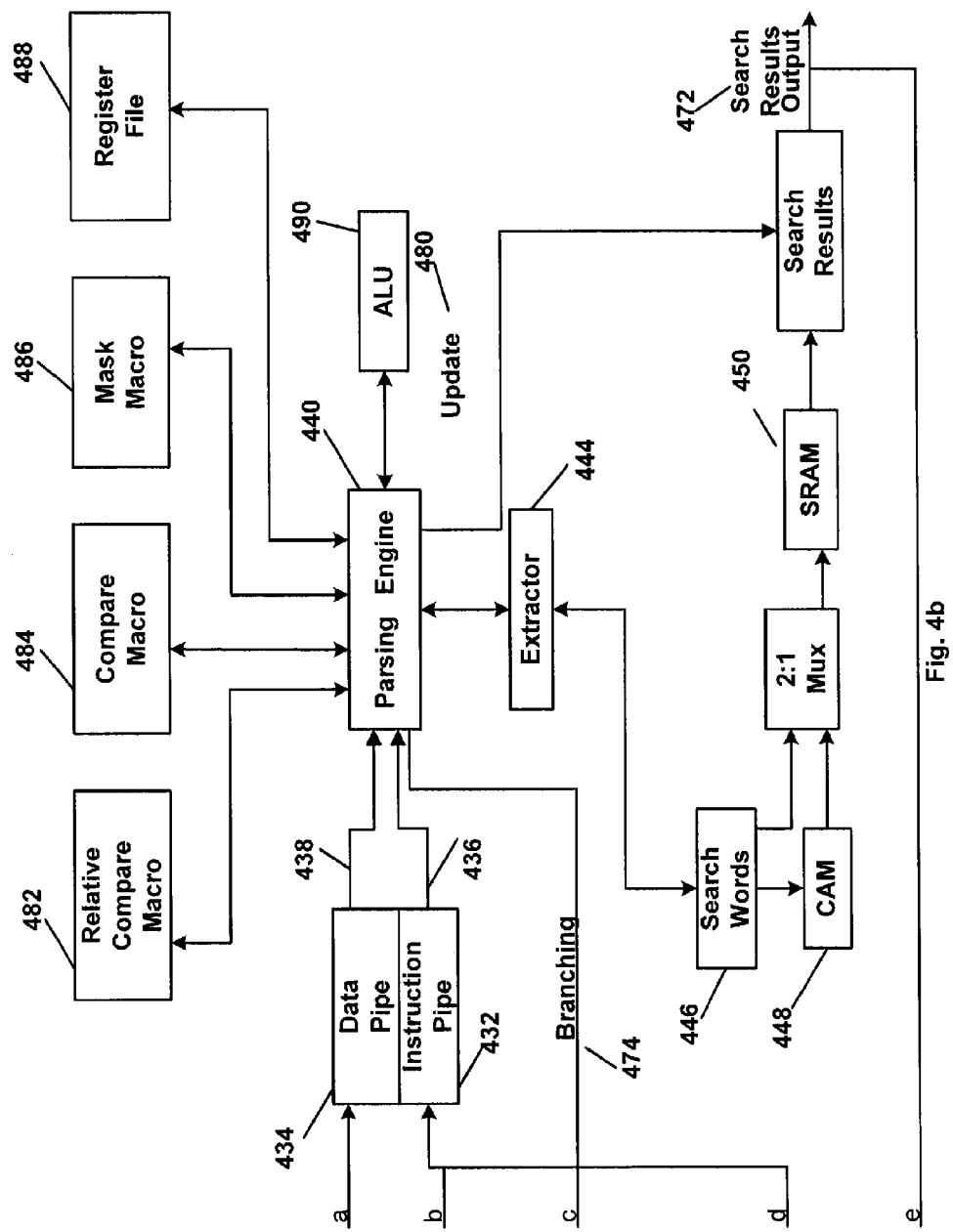

FIG. 4 illustrates a detailed block diagram 400 of an apparatus for providing multi-protocol, multi-stage, real-time frame classification according to the present invention. A preprocessor 410 classifies the type of frame 412 received. The preprocessor 410 may be programmed to identify any protocol in any OSI layer. The preprocessor 410 identifies each layer protocol using a multistage algorithm coupled with a CAM/SRAM 414 for resolving protocols, etc.

Figure 6:
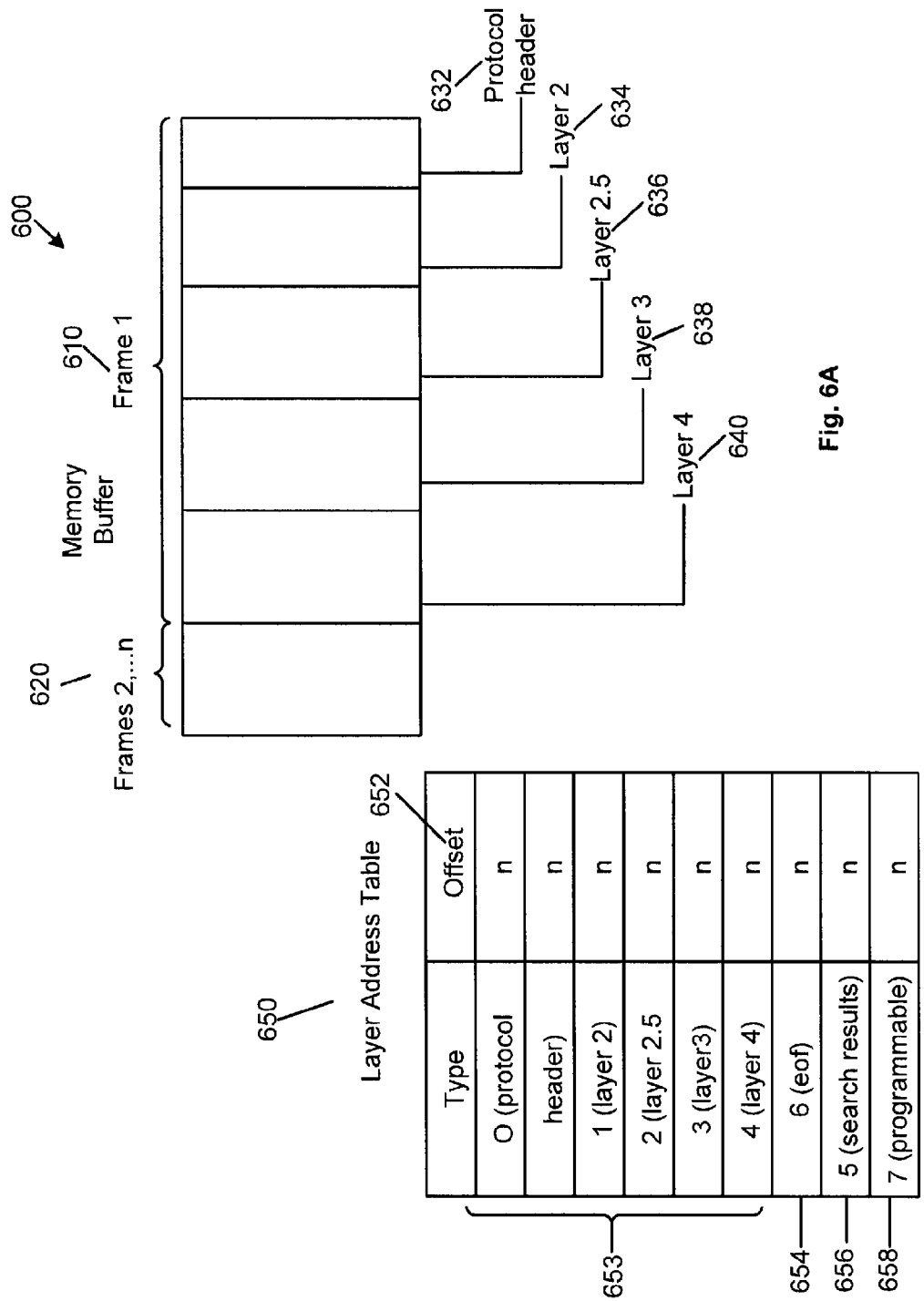
FIG. 6 illustrates the arrangement of the dual port frame buffer.

FIG. 6a illustrates the arrangement of the dual port memory buffer 600. In FIG. 6a, the memory buffer contains a first frame 610 and 2-N frames 620. The first frame 610 is shown having several segments. The first segment is the protocol header 632 followed by the Layer 2 header 634, the Layer 2.5 header 636, the layer 3 header 638 and the layer 4 header 640. The layer address table 650 in FIG. 6b provides the layer base addresses 653 which provide an indication of the address for each layer along with the search results 656, the end-of-frame 654, and other programming 658.

Referring again to FIG. 4, the frame is then written into the dual port memory buffer 416 along with the result of the preprocessor, the protocol layer code. The protocol layer code and layer 653 are stored in the protocol header 632. The dual port memory buffer 416 includes port A 418 and port B 420.

Each layer boundary is marked as to where it resides, e.g., an N-bit code is stored with the frame. A parser instruction start vector 422 is provided from the frame memory controller 424 to the instruction memory controller 460. The instruction memory controller 460 controls the instruction memory based upon the frame data from the frame memory controller 424.

The instruction memory 430 contains both instructions for the parsing engine 440 and layer offsets to access selected words in the dual port memory buffer 416. Each protocol layer within each frame is identified and its location in the memory buffer is stored in a table. The layer offset is added to the layer base address resulting in a memory pointer 426 which selects frame data 434 used for parsing. As each instruction from the instruction memory 430 is processed, the pointers are resolved by linking the layer address table 650 and layer offsets. The instruction pipe 432 and data pipe 434 serve to align the frame data with the instruction words.

The parsing engine 440 receives the instruction 436 and data 438 and performs the functions, e.g., relative compare 482, fixed compare 484, mask 486, register 488, and ALU 490, selected by the opcode in the parser instruction 436. The parser instruction set 436 defines the microcode used by the parsing engine 440. Branching 474 is provided to allow the instruction memory controller 460 to instruct the instruction memory 430 to generate instructions for the parsing engine 440 and layer offsets to access selected words in the dual port memory buffer 416. The branching 474 may be conditional branching, wherein a field in a packet is analyzed and instructions are executed based upon whether the field meets a predetermined condition.

The results 442 of the functions are passed to the extractor 444 which builds queries (search words) 446 to be search against either the CAM 448 or indexed directly to the SRAM 450. These results contain the frame classification or can be fed back to the instruction memory controller 460 to be used as either the start vector for subsequent processing stages or as data the parsing engine 440 can parse through the data pipe 434. When processing is complete, the frame is read out 470 and forwarded with the CAM/SRAM data, i.e., the search results 472. The search results 472 are provided as an output, for example, as a start instruction pointer for the editor, as a connection ID for policing, or as a different type of instruction for the editor such as for filtering.

The parsing engine 440 may also provide an update 480 to the search results 472, for example, to provide a pointer and other bits that the editor can interpret, to perform custom bit modifications, or to provide for a more dynamic configuration. The parsing engine 440 executes a new instruction each clock cycle. Because of the preprocessing by the preprocessor 410, the blueprint of the frame is known before execution of parsing instructions is initiated.

In addition, the detailed block diagram 400 may be concatenated to process the incoming frame/packet input 412 to provide scalability of multi-protocol, multi-stage, real-time frame classification. The outputs 470, 472 are interleaved and are not all valid at the same time. By concatenating the block diagram 400, the bandwidth provided may be scaled to meet the needs of the network.

Figure 5:
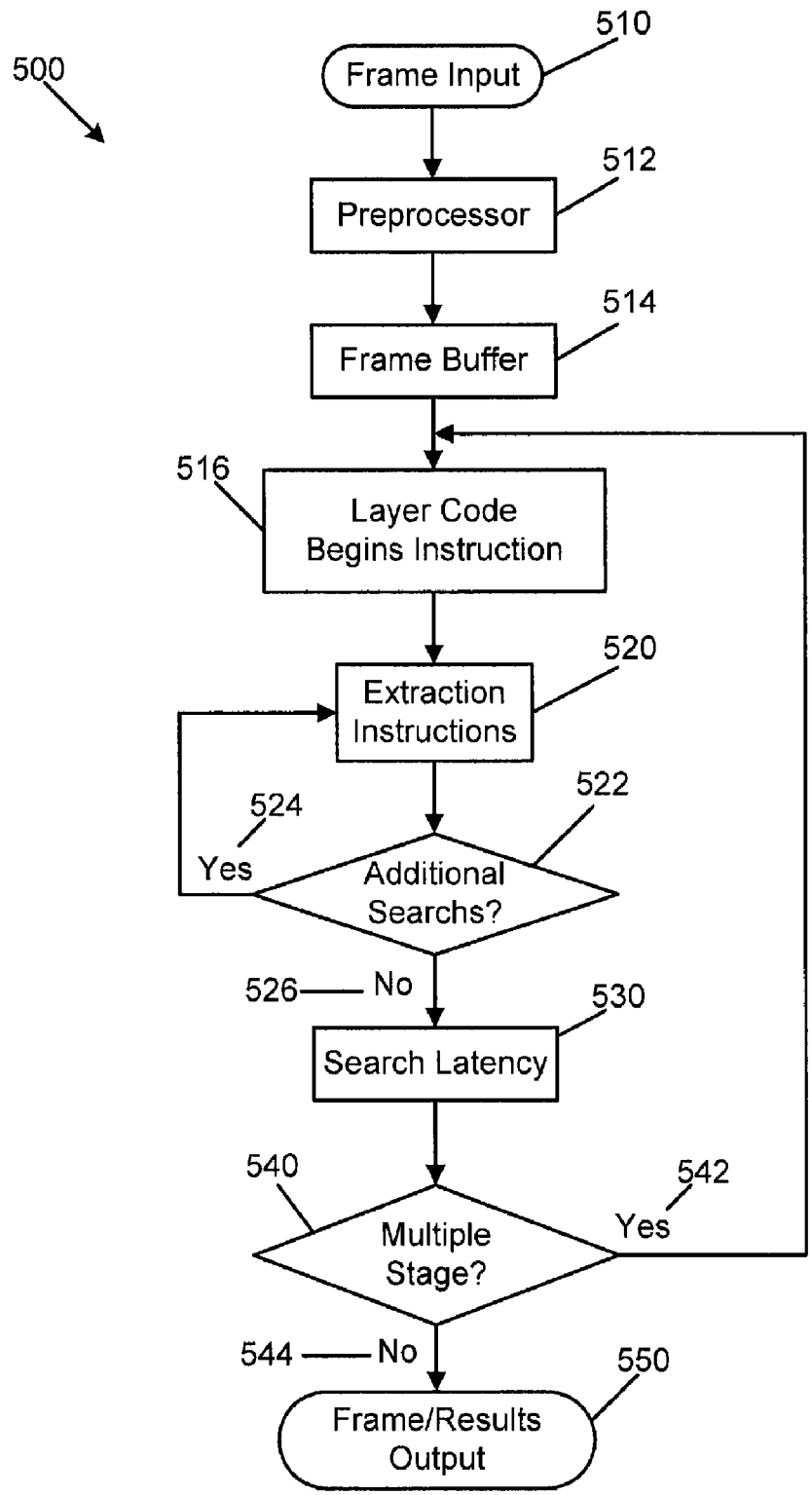
FIG. 5 illustrates a flow chart representing the processes performed by the apparatus for providing multi-protocol, multi-stage, real-time frame classification.

FIG. 5 illustrates a flow chart 500 representing the processes performed by the apparatus for providing multi-protocol, multi-stage, real-time frame classification. First a frame is received as input 510. The frame is provided to the preprocessor for classification 512. The frame is then stored in the memory buffer 514 as described above. The protocol layer code is used as a start vector into the instruction memory 516. Extraction instructions are provided for building search queries 520. A decision is made whether there are additional searches to perform 522. If yes 524, then additional extraction instructions are provided for building search queries. If not 526, then the processing continues. A search latency is provided 530. A decision is made whether multi-stage parsing is to be performed 540. If yes 542, then the search results are fed back to the instruction controller to be used as the start vector for subsequent processing stages. If not 544, the frame and the search results are provided as an output 550.

Figure 7:
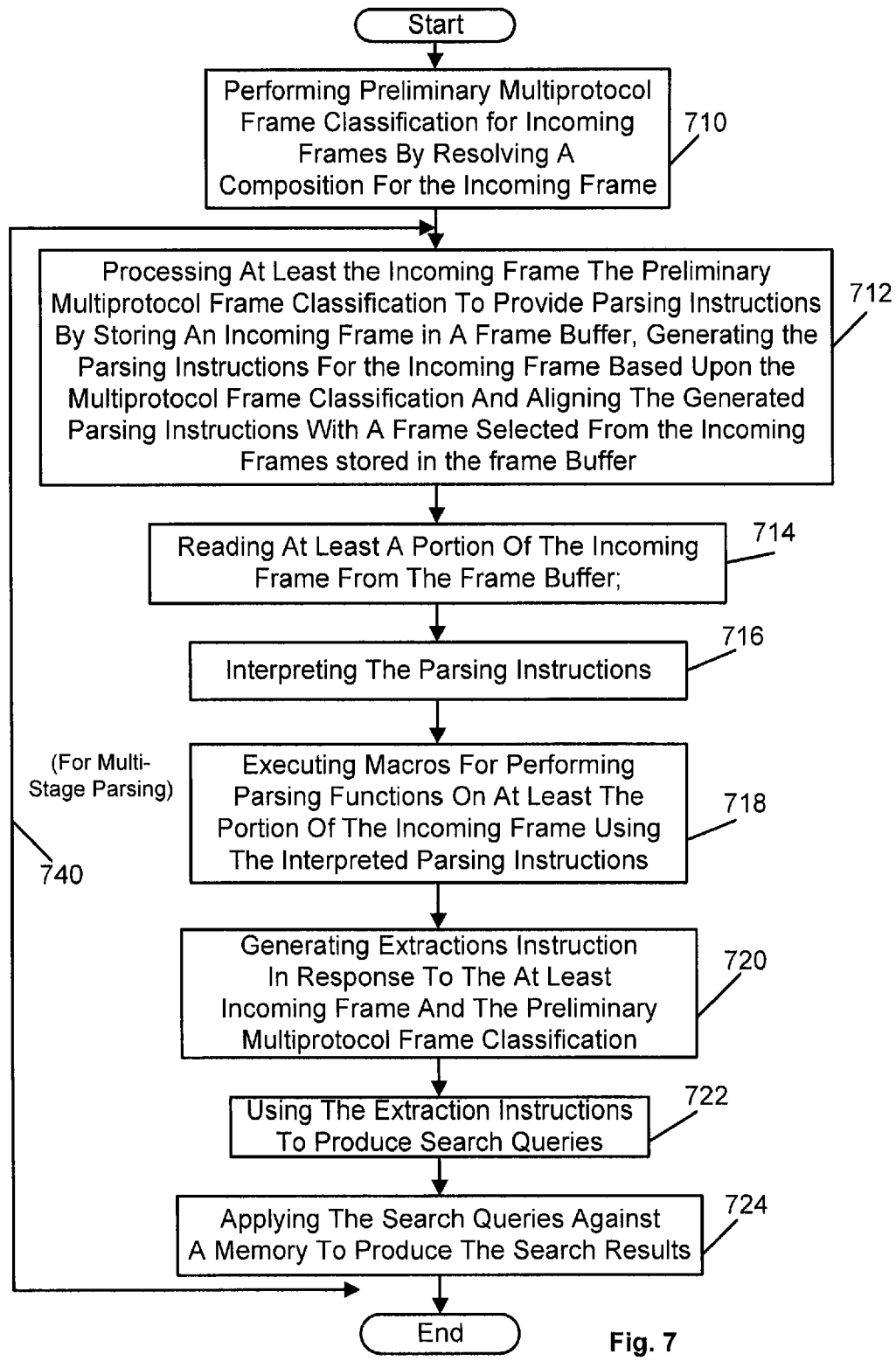
FIG. 7 illustrates a flow chart showing the processes of the detailed block diagram of the apparatus for providing multi-protocol, multi-stage, real-time frame classification with reference to FIG. 4 according to the present invention.

FIG. 7 illustrates a flow chart 700 showing the processes of the detailed block diagram of the apparatus for providing multi-protocol, multi-stage, real-time frame classification with reference to FIG. 4 according to the present invention. First, preliminary multi-protocol frame classification for incoming frames is performed by resolving a composition for the incoming frame 710. Then, at least the incoming frame and the preliminary multi-protocol frame classification is processed to provide parsing instructions by storing an incoming frame in a memory buffer, generating the parsing instructions for the incoming frame based upon the multi-protocol frame classification and aligning the generated parsing instructions with a frame selected from the incoming frames stored in the memory buffer 712. At least a portion of the incoming frame is read from the memory buffer 714. The parsing instructions are interpreted 716. Macros are executed for performing parsing functions on at least the portion of the incoming frame using the interpreted parsing instructions 718. The parsing instructions may use conditional branching. Conditional branching involves analyzing a field in a packet and executing instructions based upon whether the field meets a predetermined condition. For example, if a field in the packet meets a predetermined criteria, a first instruction is performed. Otherwise, a second instruction is performed.

Extractions instructions are generated in response to the at least incoming frame and the preliminary multi-protocol frame classification 722. The extraction instructions may invoke conditional extractions. The extraction instructions are used to produce search queries 724. The search queries are applied against a memory to produce the search results 726. The search results may be used by the instruction memory controller 460 and/or frame memory controller 424 to generated further refined parsing instructions 740. The refined parsing instructions provide greater information about the incoming frame.

The process illustrated with reference to FIG. 7 may be tangibly embodied in a computer-readable medium or carrier, e.g. one or more of the fixed and/or removable data storage devices 260 illustrated in FIG. 2, or other data storage or data communications devices. The computer program 262 may be loaded into the classifier 210 or into the memory 244 to configure the classifier 210 of FIG. 2, for execution. The computer program 262 comprise instructions which, when read and executed by the classifier 210 of FIG. 2, causes the classifier 210 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for adaptively parsing received frames that include data units having multiple field values formatted according to at least one of a set of network protocols used in a communication network, the system comprising:

a memory storing information suited to resolve the at least one of the set of network protocols;

a preprocessor configured to interact with the memory to provide a type classification for a first frame and generate a layer code based upon said type classification wherein said layer code delineates selected field values in said first frame corresponding to a protocol format of a resolved one of the set of network protocols;

a dual-port memory coupled to said preprocessor and operative to concurrently receive said first frame and said layer code;

an instruction memory operatively coupled to said dual-port memory, said instruction memory storing layer offsets associated with said selected field values delineated by said layer code and at least one instruction that is selected based upon the type classification of said first frame;

a parsing engine communicatively coupled to said instruction memory and said dual-port memory in a feed-forward data flow connection and a feed-back dataflow connection, the feed-forward dataflow connection operative to provide said parsing engine with the at least one instruction and with said layer offsets for accessing the selected field values in said first frame, said parsing engine being adapted to parse said first frame according to said at least one instruction and generate an output indicative of a classification of said first frame, said feed-back dataflow connection affecting communication between said parsing engine and at least one of said instruction memory and said dual-port memory by forwarding at least a portion of said output to said instruction memory for use in refining of said at least one instruction targeted for execution on and to said dual-port memory for re-inputting to said parsing engine through said feed-forward dataflow connection.

2. The system of claim 1 wherein said feed-back dataflow connection includes an extractor coupled to said parsing engine for receiving said output and constructing search words, said search words suitable for application against a contents-addressable memory (CAM) for obtaining search results embodying information about the first frame.

3. The system of claim 1 wherein said parsing engine is coupled to one or more of a mask unit, a compare unit, a register file and a arithmetic logic unit (ALU), wherein said mask unit is configured to mask a first portion of said first frame to provide masked frame data, said compare unit is adapted to compare the at least one selected field value in said masked frame data to a predetermined value to generate at least a partial identity of the protocol format of the resolved one of the set of network protocols, said ALU is adapted to process one or more of the at least one selected field, said partial identity of said protocol format to provide updated output indicative of the classification of said first frame.

4. The system of claim 1 wherein said parsing engine is provided with a data pipe and a instruction pipe disposed in said feed-forward dataflow connection in data communication with said dual-port memory and said instruction memory respectively that maintain said first frame and said at least one instruction substantially aligned with each other.

5. The system of claim 4 wherein said data units correspond to two or more frames and arrive in an interleaved sequence with said data pipe and said instruction pipe is operative to align said data units from the first frame with said at least one instruction that is selected responsive to the type classification of said first frame.

6. The system of claim 1 wherein said at least one instruction that is selected based upon the type classification of said first frame includes a first sequence of instructions having at least one branch instruction that enables said instruction memory to select a second sequence of instructions targeted for execution by said parsing engine, said second sequence of instructions being based on at least a partial parsing of the first frame using one or more of said first sequence of instructions.

7. The system of claim 1 wherein said at least one instruction comprises instructions drawn from the group consisting of EXTRACT, MASK, NOT, AND, OR, XOR, and Range.

8. A method for classifying a frame composed of data-fields formatted according to protocol layers used in a communication network, the method comprising:

storing predetermined data in a first memory wherein said predetermined data enables at least a partial resolution of said protocol layers;

operating a preprocessor in interactive communication with the first memory to correlate at least a portion of the predetermined data with one or more data-fields to obtain class information for the frame, said class information including indicia pointing to boundaries between said protocol layers;

concurrently transferring said data-fields and said class information to be stored in a second memory; selectively loading an instruction memory with a sequence of program instructions for subsequent processing of said frame responsive to said data-fields and said class information;

parsing said frame by operating on said data-fields, pointed to by said indicia, using said sequence of program instructions to output a first set of search words indicative of an identification of said data-fields at a first resolution;

iteratively refining said sequence of program instructions responsive to said first set of search words and causing said refined sequence of program instructions to operate on one or more of said data-fields and said first set of search words to generate a second set of search words indicative of the identification of said data-fields at a second resolution greater than said first resolution; and outputting said data-fields and said second set of search words when said second resolution meets predefined criteria.

9. The method of claim 8 further including aligning said data-fields with the sequence of program instructions before said program instructions operate on said data-fields.

10. The method of claim 9 wherein said data-fields include two or more sets of data-fields corresponding to two or more arriving frames with each set of data-fields embodying differing protocol layers, said step of aligning said data-fields with the sequence of program instructions including aligning said a first set of data-fields with an associated first sequence of program instructions and a second set of data-fields with an associated second sequence of program instructions.

11. The method of claim 10 wherein said step of parsing said frame includes interleaving operation of both said first sequence of program instructions on said first data-fields and said second sequence of program instructions on said second data-fields during a single time span.

12. The method of claim 8 wherein said frame ingresses at a first bit-rate and egresses at a second bit-rate that is substantially equal to said first bit-rate.

13. The method of claim 8 wherein said predefined criteria corresponds to identification of all protocol layers for said frame.

14. The method of claim 8 wherein said step of outputting said first set of search results further includes: using an extractor with an output of said parsing engine to build search keys; and applying said search keys against a contents-addressable memory (CAM) to generate said first set of search results that contain a frame classification.

15. The method of claim 8 wherein parsing said frame includes the steps of: receiving predetermined data corresponding to at least one protocol layer; extracting said frame into a plurality of bit fragments of varying length using at least one data mask; comparing said predetermined data with at least one bit fragment to generate at least one comparison result; storing said at least one comparison result in a first register; concatenating said comparison results from said register to obtain a search key; and indexing a memory using said search key to generate a classification of said frame.

16. The method of claim 15 further comprising the steps of: providing a content-addressable memory (CAM); storing a plurality of instructions for handling said frame in said CAM; receiving said search key at said CAM and outputting a set of instructions from said stored plurality of instructions responsive to said search key; and reparsing said frame using said outputted set of instructions.

* * * * *

UNITED STATES PATENT AND TRADEMARK OFFICE
CERTIFICATE OF CORRECTION

| | | |
|---|---|---|
| PATENT NO. | : 7,835,375 B2 | Page 1 of 1 |
| APPLICATION NO. | : 11/950651 | |
| DATED | : November 16, 2010 | |
| INVENTOR(S) | : Sarkinen et al. | |

It is certified that error appears in the above-identified patent and that said Letters Patent is hereby corrected as shown below:

Column 1, line 12 delete "2006" and insert in its place --2005--.

Signed and Sealed this
Twentieth Day of September, 2011

David J. Kappos
*Director of the United States Patent and Trademark Office*